United States Patent
Alberti et al.

[19]

[11] Patent Number: 5,964,166
[45] Date of Patent: Oct. 12, 1999

[54] PULVERIZED COAL INJECTION NOZZLE

[75] Inventors: Marco Alberti, Milan; Roberto Rizzi, Monza; Marcello Martano, Adelfia; Gennaro De Michele, Pisa; Sergio Ligasacchi, S. Giuliano Terme, all of Italy

[73] Assignees: Enel S.p.A., Genoa; Ansaldo Energia S.p.A., Rome, both of Italy

[21] Appl. No.: 08/896,274

[22] Filed: Jul. 15, 1997

[30] Foreign Application Priority Data

Oct. 8, 1996 [EP] European Pat. Off. .............. 96116099

[51] Int. Cl.$^6$ ................................ F23C 1/10; F23D 1/00; B05B 7/12
[52] U.S. Cl. ...................... 110/261; 110/263; 110/104 B; 110/260; 239/416
[58] Field of Search ................................... 110/260, 261, 110/262, 263, 264, 265, 104 B; 431/159, 181, 185, 186, 187, 189; 239/8, 401, 416

[56] References Cited

U.S. PATENT DOCUMENTS

| 3,834,857 | 9/1974 | Hemingway et al. | 431/158 |
|---|---|---|---|
| 3,904,349 | 9/1975 | Peterson et al. | 431/184 |
| 4,348,170 | 9/1982 | Vatsky et al. | 431/188 |
| 4,479,442 | 10/1984 | Itse et al. | 110/261 |
| 5,145,359 | 9/1992 | Ancona et al. | 431/184 |
| 5,292,244 | 3/1994 | Xiong | 431/189 |
| 5,347,937 | 9/1994 | Vatsky | 110/261 |
| 5,388,536 | 2/1995 | Chung | 110/264 |
| 5,408,943 | 4/1995 | Vatsky | 110/261 |

FOREIGN PATENT DOCUMENTS

| 0 163 423 A1 | 12/1985 | European Pat. Off. . |
| 0 409 102 A2 | 1/1991 | European Pat. Off. . |
| 0 554 014 A2 | 8/1993 | European Pat. Off. . |
| 0 571 704A2 | 12/1993 | European Pat. Off. . |

*Primary Examiner*—Ira S. Lazarus
*Assistant Examiner*—Ljiljana V. Ciric
*Attorney, Agent, or Firm*—Finnegan, Henderson, Farabow, Garrett & Dunner, L.L.P.

[57] ABSTRACT

A nozzle for the injection of solid fuel in dust form into a combustion chamber, to be installed in correspondence with the outlet of a burner coaxially to the longitudinal axis of the burner, comprising a stationary annular part divided into coal ducts of a circumferential width that decreases towards outlet section to form coal-dust-rich air streams, a central duct for a coal-dust-poor air stream sideways delimited by the coal ducts and having an outlet end, a central member that is axially mobile within the central duct, for varying the cross section of a central passage delimited by the stationary annular part at the outlet end. Air ducts for the coal-dust-poor air stream are formed between each pair of adjacent coal ducts in the stationary annular part communicating with the central duct and having a circumferential width increasing toward the outlet end. Deflectors for the coal-dust-poor stream are provided at the outlet from the ducts to direct the stream from each air duct in a direction diverging radially from the central duct.

6 Claims, 2 Drawing Sheets

PULVERIZED COAL INJECTION NOZZLE

FIELD OF THE INVENTION

The present invention relates to a nozzle for injecting a solid fuel, such as pulverized coal, into a combustion chamber particularly suitable for being mounted on a burner providing a three-phase combustion to limit the production of nitrogen oxides. The nozzle of the present invention is especially designed for burners operating with either liquid or solid fuels and with either gas or liquid or solid fuels.

BACKGROUND ART

It is a known fact that nitrogen oxides are one of the most important pollutants produced during combustion processes, and are found in exhaust fumes released into the environment by steam generators, thermoelectric power stations and other industrial installations in which fossil fuels are burned. The formation of nitrogen oxides is due in part to the presence of N-compounds in the fuel (chemical NOx) and in part to the atmospheric nitrogen in the combustion air (thermal NOx). The NOx formation during the combustion process is dependent on a number of parameters, among which the main ones are the flame temperature, the time the combustion gases remain in the high-temperature zone and the excess air. More specifically, formation of nitrogen oxides increases as the flame temperature increases, and can be minimised by keeping the peak values under control. A similar effect is produced when the fuel remains in the high-temperature zone for a short time and by a reducing atmosphere or an excess of fuel in the ignition area.

From what has been stated above it is clear that a combined control of the above mentioned operating parameters will allow the formation of nitrogen oxides during combustion to be limited.

In burners in which it is possible to burn solid fuel in powder form, for example coal dust, the geometry of the air-coal mixture injector nozzle is of primary importance for the control of combustion and therefore for the production of NOx. In particular it is necessary to create areas that are poor in oxygen and rich in coal in the ignition area, and furthermore the time that the fuel remains therein must be such as to minimise the production of NOx and unburned substances. Finally, the recirculation streams around the end of the nozzle must be controlled in order to avoid excessively high temperatures and local fusion phenomena, which would damage the nozzle irreversibly. In a solid fuel nozzle of a known type manufactured by Foster Wheeler Energy Corporation (see U.S. Pat. No. 5,347,937), tangential inlet for the air-coal mixture is provided to convey said mixture towards four or more ducts, whose cross-sections converge towards the combustion chamber and which are arranged in correspondence with the outlet into said chamber along an annulus coaxial with the primary air duct. In this way jets of air-coal mixture rich in coal dust are formed. Between two adjacent mixture ducts there is a duct with a diverging cross-section, through which air is injected into the ignition area, said air being taken up through slots formed on the external shell of the nozzle. Injection of the air through these ducts is necessary in order to prevent the temperature of the nozzle from reaching excessively high values, but it also increases the level of oxygen in the ignition area, with an adverse effect on the reduction of NOx and therefore on the performance of the nozzle.

SUMMARY OF THE INVENTION

The object of the present invention is to provide a nozzle for injection of solid fuel-air mixtures, the solid fuel being coal dust or the like, capable of giving improved combustion conditions with respect to known devices of this kind.

The above object is achieved with the nozzle according to the present invention, the main features of which are defined in the claims.

BRIEF DESCRIPTION OF THE DRAWINGS

Further characteristics and advantages of the pulverized coal injection nozzle according to the present invention will become clear from the following description of a preferred embodiment thereof, given merely as a nonlimiting example and with reference to the enclosed drawings, in which.

DESCRIPTION OF THE PREFERRED EMBODIMENT

Figure 1:
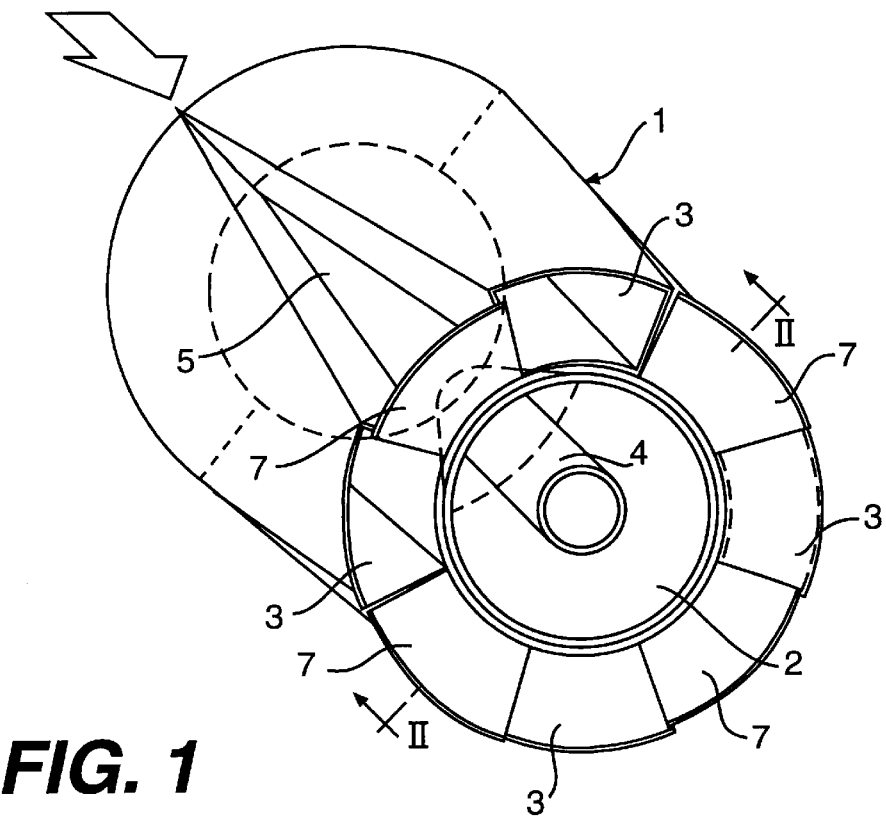
FIG. 1 is a perspective view of a nozzle for coal/air mixtures according to the present invention.

The nozzle according to the invention is designed to be installed at the outlet end of a burner in a coaxial relationship to the primary air duct in a conventional way, as described for instance in U.S. Pat. No. 5,823,764, filed on the same date as the present application by the same inventors.

With reference to the FIGS. 1 through 4, the nozzle according to the invention comprises a stationary part 1 which serves the purpose of concentrating the coal dust into physically separated streams, and a mobile member 2 which serves the purpose of registering the outflow of primary and combustion air according to the manner in which the desired combustion process is to be carried out.

The stationary part 1 consists of a group of at least three ducts 3 with the shape of a truncated cone converging towards a combustion chamber, not shown, suitable to be arranged according to an annulus coaxial with the primary air duct of the burner and an oil lance within a central tube 4, so as to transform 100% of the annulus section at the inlet into 40–60% of the section at the outlet. As an example, in FIG. 1 an embodiment with four ducts 3 is shown. In this way the coal dust, which is already concentrated toward the wall of the primary air duct by a swirler not shown, installed in said duct upstream from the nozzle, is divided into various streams characterized by a low air/coal ratio. Between coal ducts 3 air ducts 5 are formed each having a section which increases towards the combustion chamber and communicating with an inner duct 6 delimited by ducts 3 therearound. Therefore, at the nozzle outlet the outlet ports of air duct 5 alternate with those of ducts 3.

The mobile member 2, coaxial with the oil lance, has a conical cup shape and can be displaced between two end positions and a plurality of intermediate positions, as it is connected to central tube 4 and is moved by means of a 11, shown for schematic purposes only, along inner duct 6.

The primary air transporting the coal dust reaches the nozzle, as stated above, with a coal-dust-rich stream at the periphery of the air duct and a coal-dust-poor stream at the center. The coal dust rich stream enters ducts 3 of stationary part 1 of the nozzle, as shown by dark arrows in FIG. 3, while the coal-dust-poor stream, flowing through the central section of primary air duct of the burner, enter inner duct 6 and is divided in two sub-streams depending on the position of mobile part 2 of the nozzle. A first sub-stream flows through air duct 5, as shown by the light arrows in FIG. 3, and the second one is directed toward the outlet of inner duct 6 and fed to the combustion chamber through the passage defined by the outlet end of inner duct 6 and mobile member 2 of the nozzle coaxial thereon. Inclined plates 7 are positioned at the nozzle outlet in correspondence with the outlets from the air ducts 5.

Inclined plates 7 have the aim of radially deflecting the coal-dust-poor primary air away from the center to it with the secondary air, and have an inclination of between 45 and 90° with respect to a longitudinal axis of the central duct, optionally adjustable in a known manner by means of a control rod, not shown.

Figure 2:
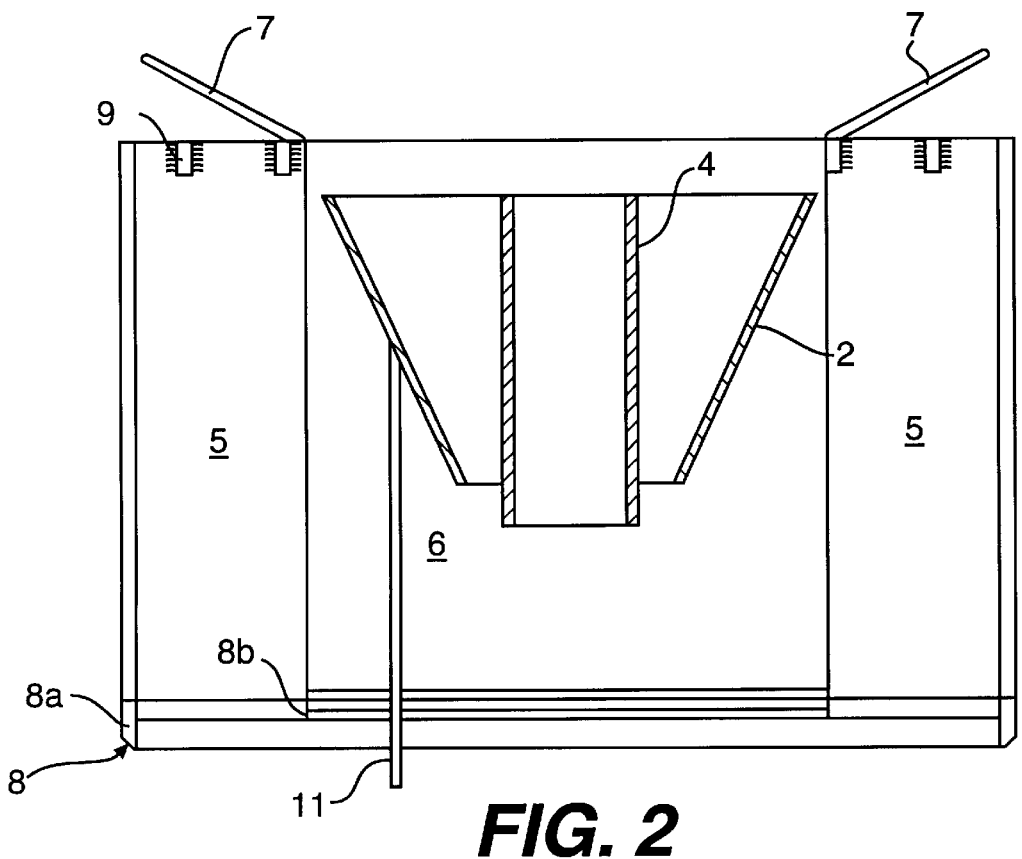
FIG. 2 is a partial cross-sectional view of the nozzle of FIG. 1 taken along line II—II.
Figure 4:
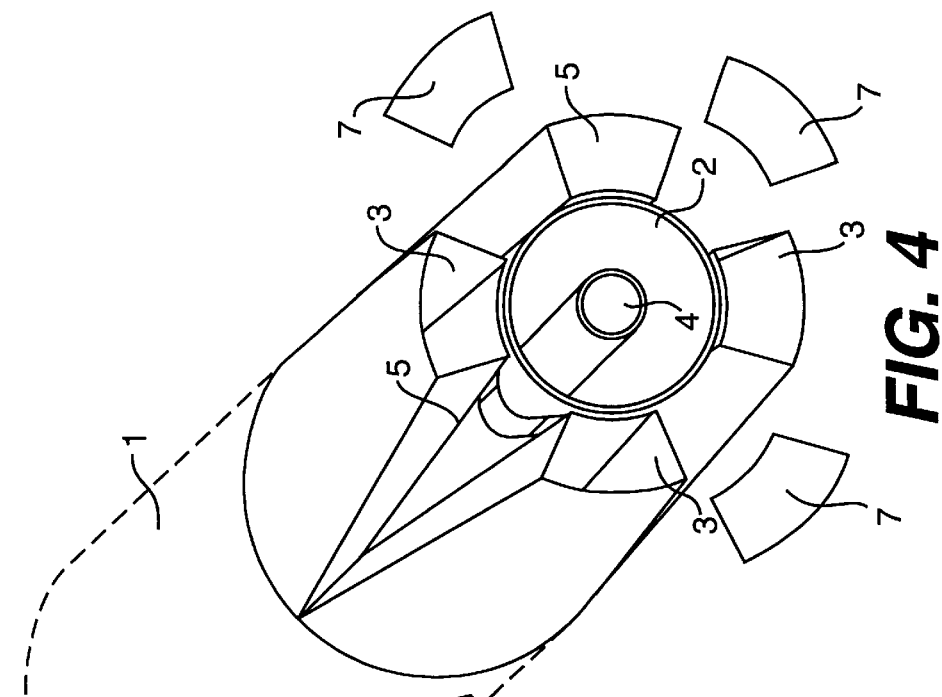
FIG. 4 is a perspective view of the nozzle of FIG. 1 with arrows showing the flow of the gas streams.
Figure 3:
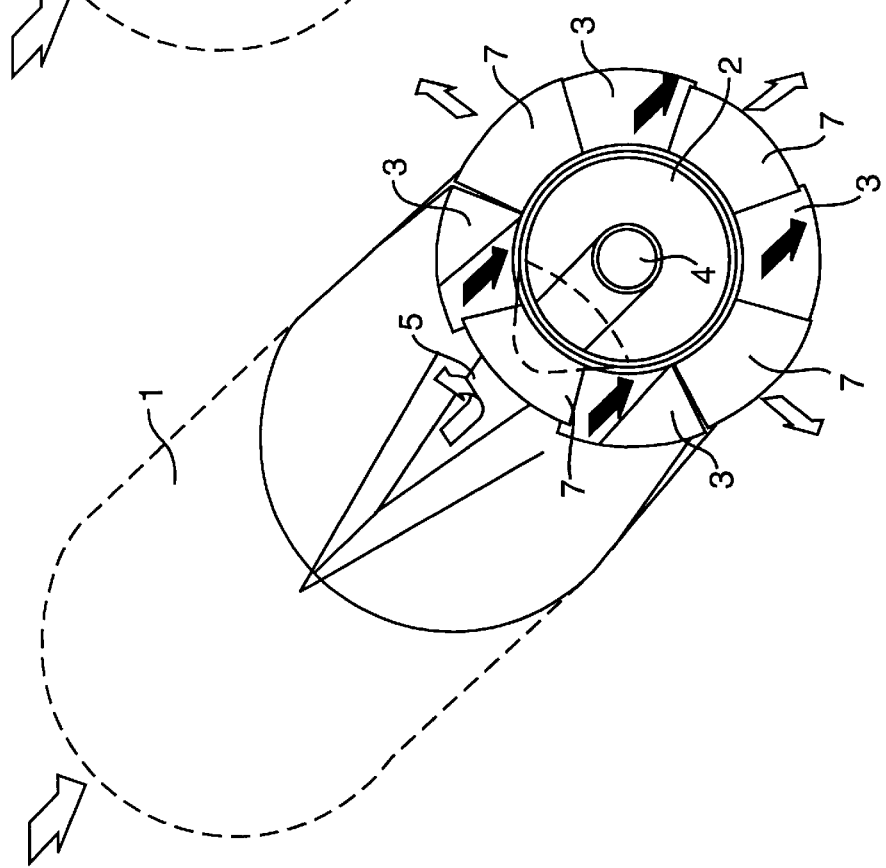
FIG. 3 is a perspective view of the nozzle of FIG. 1 with the inclined plates removed in order to better view the structure of the present invention.

In an embodiment shown in FIG. 2, given as an example, ducts 3 for the air-coal mixture are tubular sectors of an annulus with a cross section that decreases from the inlet to the outlet, which are welded at their inlet end to a support 8 made up of two concentric annular members 8a, 8b connected by radial arms not shown, while at their outlet ends ducts 3 are connected by means of circumferential tie rods 9 in the shape of rings which give adequate allowance for thermal dilatation.

The composition of the two-phase mixture at the burner outlet depends on how the process of mixing the coal-dust-poor and the coal-dust-rich air streams is performed, this composition being the basic parameter for the control of NOx emission, unburned fuel and flame stability.

According to the present invention, by suitably combining the position of the mobile member 2 with the effect of the stationary part 1 it is possible to define an optimum solution to respond to the various requirements of different installations.

With mobile member 2 a long way back, the flame is longer, the combustion process is slow, so that NOx is minimum, but CO and unburned fuel are maximum.

With mobile member 2 a long way forward, combustion is intense and localised, due to the high level of coal dust/air mixing, NOx are maximum, CO and unburned products minimum.

The nozzle according to the invention has been installed on a burner according to our copending U.S. application, now U.S. Pat. No. 5,823,764. The burner has been tested at full scale underlining the following performances:

a NOx reduction in the order of 50%, when oil and coal are burnt, as compared with traditional "CIRCULAR" type burners;

during coal fuelling a reduction in the level of unburned products in the order of 50%, as compared with a first generation "Low NOx" burner.

Variations and/or modifications can be brought to the pulverized coal injection nozzle fuels according to the present invention, without departing from the scope of the invention itself, as defined in the appended claims.

We claim:

1. A nozzle for the injection of solid fuel in dust form into a combustion chamber, to be installed at the outlet of a burner coaxially to the longitudinal axis of the burner, comprising a stationary annular part divided into coal ducts, each of a circumferential width that decreases towards an outlet section to form coal-dust-rich air streams, a central duct for a coal-dust-poor air stream radially delimited by said coal ducts and having an outlet end, a central member that is axially mobile within said central duct, for varying the cross section of a central passage delimited by said stationary annular part at said outlet end, air ducts for the coal-dust-poor air stream formed between each pair of adjacent coal ducts in said stationary annular part, said air ducts communicating with said central duct, said air ducts having a circumferential width that increases toward said outlet end, and deflector means for said coal-dust-poor air stream provided at the outlet from said air ducts to direct said coal-dust-poor air stream from each air duct in a direction diverging radially from said central duct.

2. The nozzle according to claim 1, in which the inclination of said deflector means is adjustable within a range of between 45° and 90° with respect to a longitudinal axis of said central duct.

3. The nozzle according to claim 1, in which the inlet overall cross section of said coal ducts for the coal-dust-rich air stream is substantially equivalent to 100% of the section at the inlet of said stationary annular portion, whereas the outlet overall cross section of said coal ducts is equal to 40–60% of the section at the outlet of said stationary annular part.

4. The nozzle according to claim 1, in which said coal ducts have inlet and outlet ends and are axially fixed at said inlet ends to a support formed by two concentric ring elements connected to each other and radially spaced at a distance substantially equal to the radial width of said coal ducts, said coal ducts being connected to one another by rings at said outlet ends.

5. The nozzle according to claim 1, in which said mobile member is a hollow cup-shaped cone member with a hollow part facing towards the combustion chamber.

6. The nozzle according to claim 1, in which a tubular housing is provided in the central duct to house an oil lance.

* * * * *